(12) United States Patent
Pionke

(10) Patent No.: US 7,909,127 B1
(45) Date of Patent: Mar. 22, 2011

(54) WHEEL HUB CARTRIDGE AND CARRIER

(75) Inventor: Ralf Pionke, Farmington Hills, MI (US)

(73) Assignee: AM General LLC, South Bend, IN (US)

( * ) Notice: Subject to any disclaimer, the term of this patent is extended or adjusted under 35 U.S.C. 154(b) by 240 days.

(21) Appl. No.: 12/313,307

(22) Filed: Nov. 18, 2008

(51) Int. Cl.
*B60K 17/30* (2006.01)

(52) U.S. Cl. ........ 180/252; 180/253; 180/255; 301/125; 301/126

(58) Field of Classification Search .......... 180/252, 180/253, 255, 261; 301/126, 125, 131, 132, 301/124.1, 105.1
See application file for complete search history.

(56) References Cited

U.S. PATENT DOCUMENTS

| | | | | | |
|---|---|---|---|---|---|
| 4,344,501 | A | * | 8/1982 | Jerry et al. | 180/253 |
| 4,625,846 | A | * | 12/1986 | Gomez | 192/69.41 |
| 4,960,192 | A | * | 10/1990 | Kurihara | 192/69.41 |
| 5,024,122 | A | * | 6/1991 | Parzl et al. | 74/606 R |
| 5,281,911 | A | * | 1/1994 | Caron et al. | 324/174 |
| 5,472,059 | A | * | 12/1995 | Schlosser et al. | 180/65.51 |
| 5,588,932 | A | * | 12/1996 | Lindblad | 475/341 |
| 6,117,040 | A | * | 9/2000 | Watterodt et al. | 475/299 |
| 6,485,188 | B1 | * | 11/2002 | Dougherty | 384/589 |
| 6,676,226 | B2 | * | 1/2004 | Hahn | 301/105.1 |
| 6,883,816 | B2 | * | 4/2005 | Baker et al. | 280/93.512 |
| 7,204,339 | B2 | * | 4/2007 | Varela et al. | 180/371 |
| 2003/0062765 | A1 | * | 4/2003 | Melton | 301/137 |
| 2004/0082420 | A1 | * | 4/2004 | Robinson | 475/183 |
| 2005/0133290 | A1 | * | 6/2005 | Ewer | 180/247 |
| 2009/0039700 | A1 | * | 2/2009 | Gradu et al. | 301/111.02 |
| 2010/0007198 | A1 | * | 1/2010 | Armfield | 301/132 |
| 2010/0225157 | A1 | * | 9/2010 | Kirby | 301/131 |

OTHER PUBLICATIONS

2003 Hummer H1 Parts Catalog, AM General LLC.
Webpage Showing Front Spring Strut/Carrier/Wheel Bearing for 2004 Cooper S.
Internet Catalog Page Showing 2004 Cooper S Front Wheel Bearing.

* cited by examiner

*Primary Examiner* — Lesley Morris
*Assistant Examiner* — Tashiana Adams
(74) *Attorney, Agent, or Firm* — Barnes & Thornburg LLP

(57) ABSTRACT

A two piece wheel hub assembly includes a hub cartridge assembly and a vehicle-mounted carrier. The cartridge assembly can be readily attached to and removed from the carrier without removal of the carrier from the vehicle.

17 Claims, 6 Drawing Sheets

WHEEL HUB CARTRIDGE AND CARRIER

BACKGROUND OF THE INVENTION

The present invention is directed generally to vehicle hubs. More particularly, the present invention is directed to a wheel hub cartridge, for example, a geared wheel hub cartridge, and a vehicle-mounted carrier configured to receive the hub cartridge.

Some known wheel hub assemblies integrate hub components with a steering knuckle, as would be recognized by one skilled in the art. For example, the geared wheel hub assemblies used by AM General LLC in its HMMWV product, integrate a steering knuckle with a geared hub assembly including an internal gear set coupled to a spindle carrying a flange to which a wheel can be attached. Integrating the gear set and steering knuckle in this manner can yield a very robust and relatively compact assembly. Such a hub assembly, however, typically is relatively heavy because the entire knuckle/gear housing typically is made of a single, sturdy, and heavy material, for example, heat-treated ductile iron, selected for its strength and resilience to the significant static and dynamic loads it might be subjected to during use.

Although such hub assemblies can be very robust, their internal components nevertheless can fail in use, particularly when the vehicle is used in hostile environments or under unduly heavy loads. Although such hub assemblies might be repairable or rebuildable, it typically is impractical to service them in the field or while attached to the vehicle. As such, the common practice for dealing with a failed hub assembly is to remove it from the vehicle, replace it with a functional hub assembly, repair or rebuild the failed hub assembly, and make the repaired or rebuilt hub assembly available for use as a replacement for another failed hub assembly. Even replacement of the entire hub assembly in the field, however, can be a daunting task that typically requires special tools and skills.

SUMMARY OF THE INVENTION

The present invention is directed to a two-piece wheel hub cartridge and carrier assembly. The carrier can be attached to the vehicle conventionally. The hub components can be incorporated into the cartridge, which can be attached to the carrier and readily removed from the carrier and replaced as necessary. The hub assembly can include internal gearing and/or an integral wheel speed sensor.

DETAILED DESCRIPTION OF THE DRAWINGS

Figure 1:
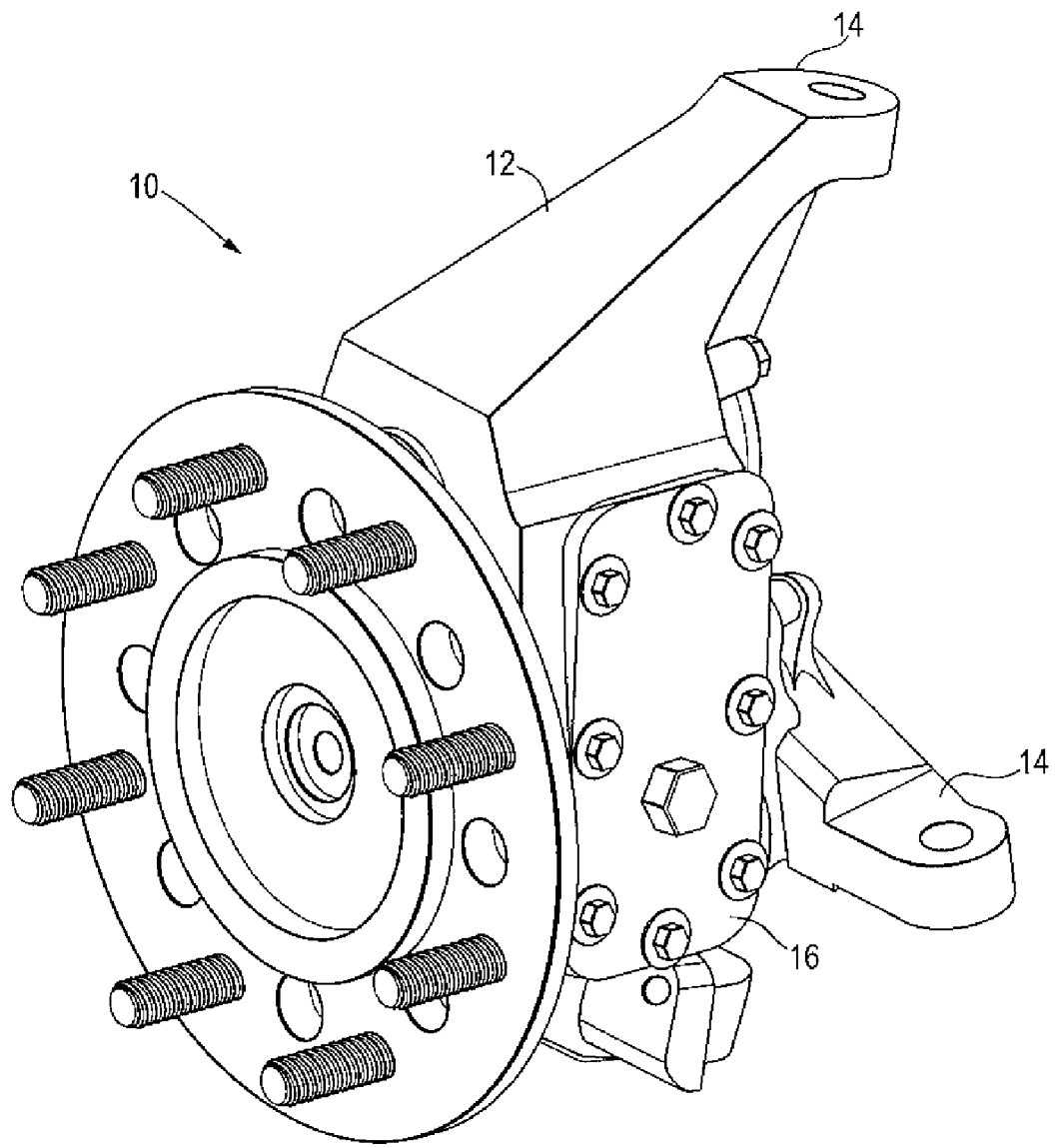
FIG. 1 is a perspective view of a prior art geared hub assembly.
Figure 2:
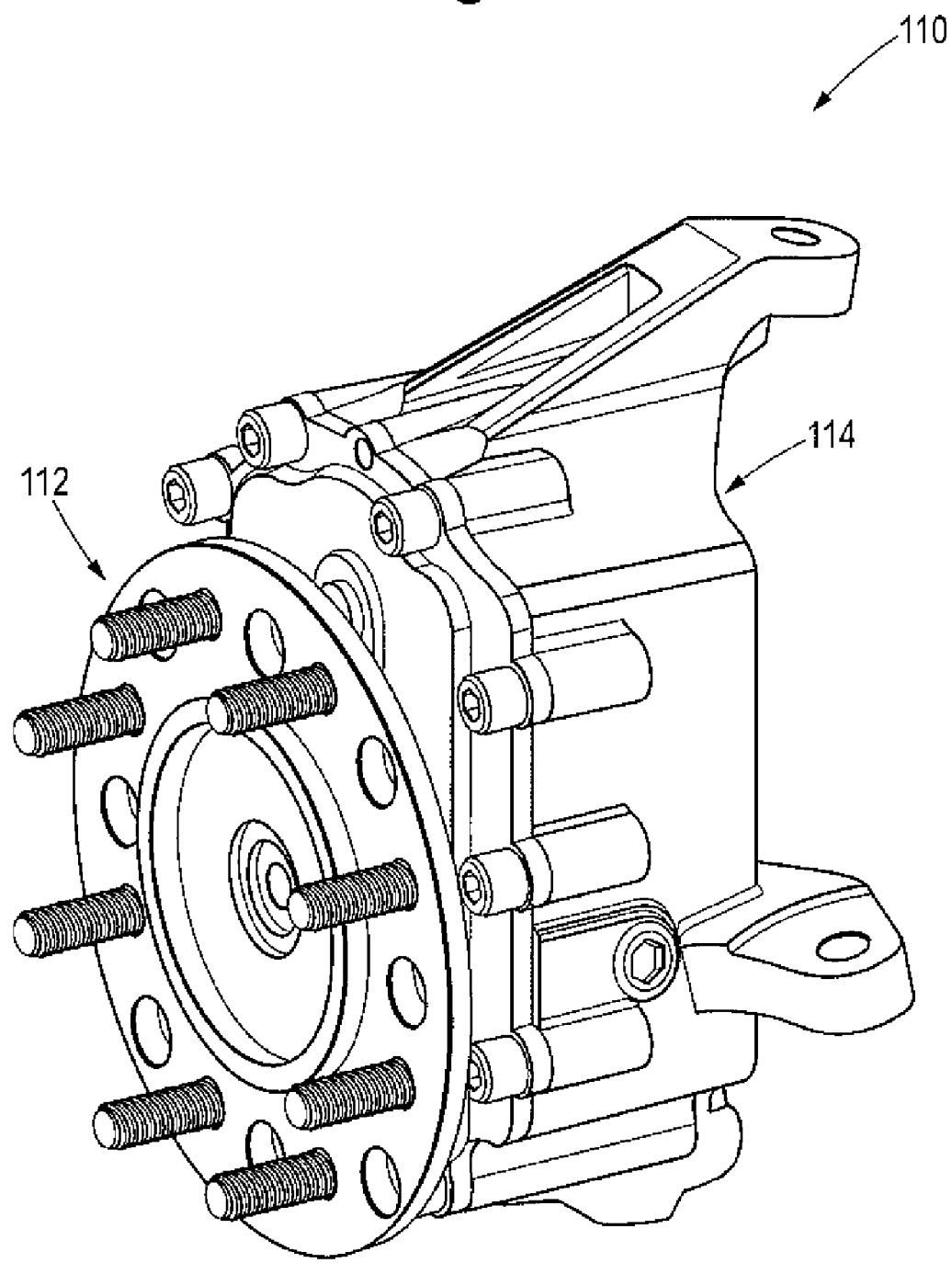
FIG. 2 is a perspective view of a two-piece geared hub assembly according to the present invention.
Figure 3:
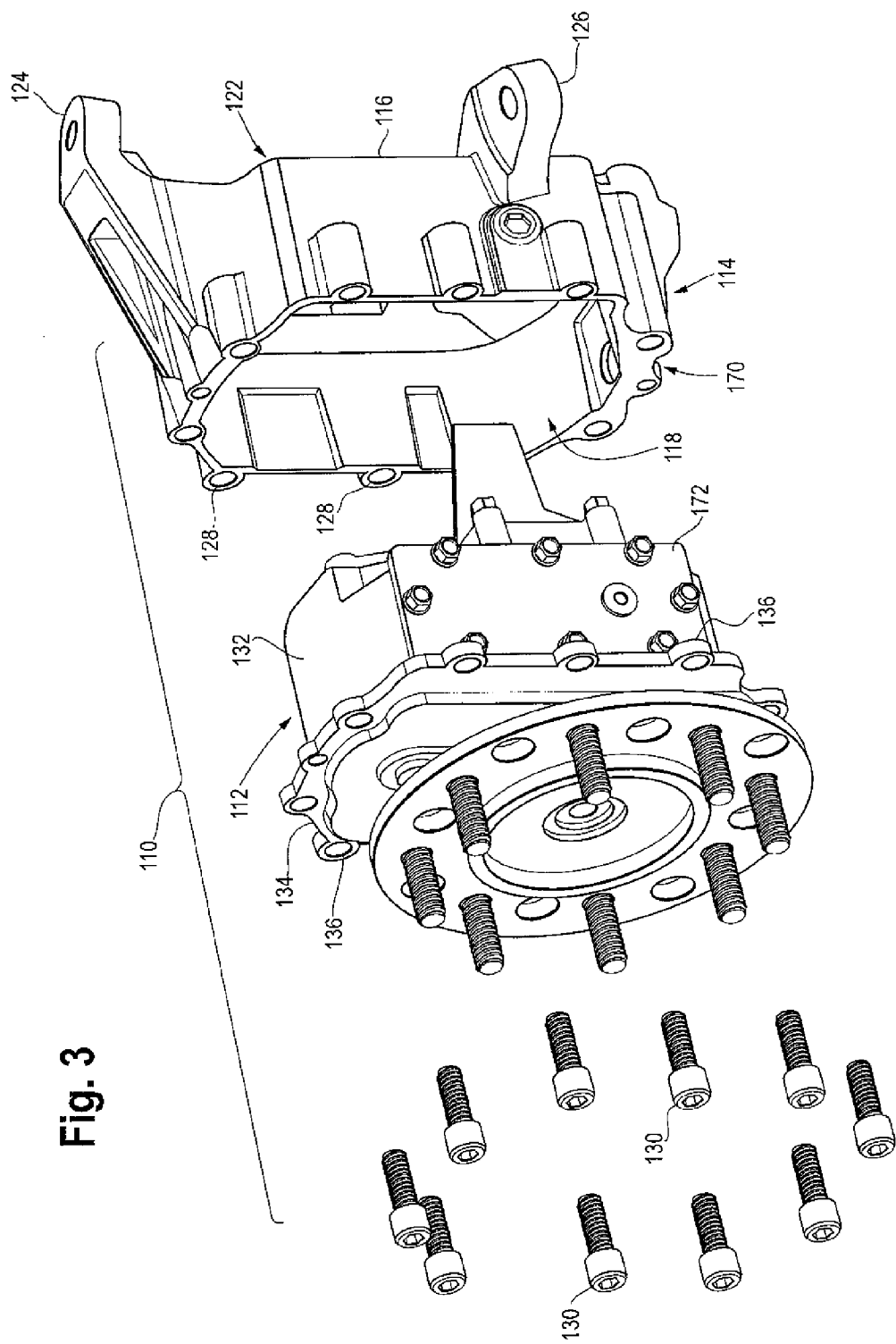
FIG. 3 is an exploded perspective view of a two-piece geared hub assembly according to the present invention.
Figure 4:
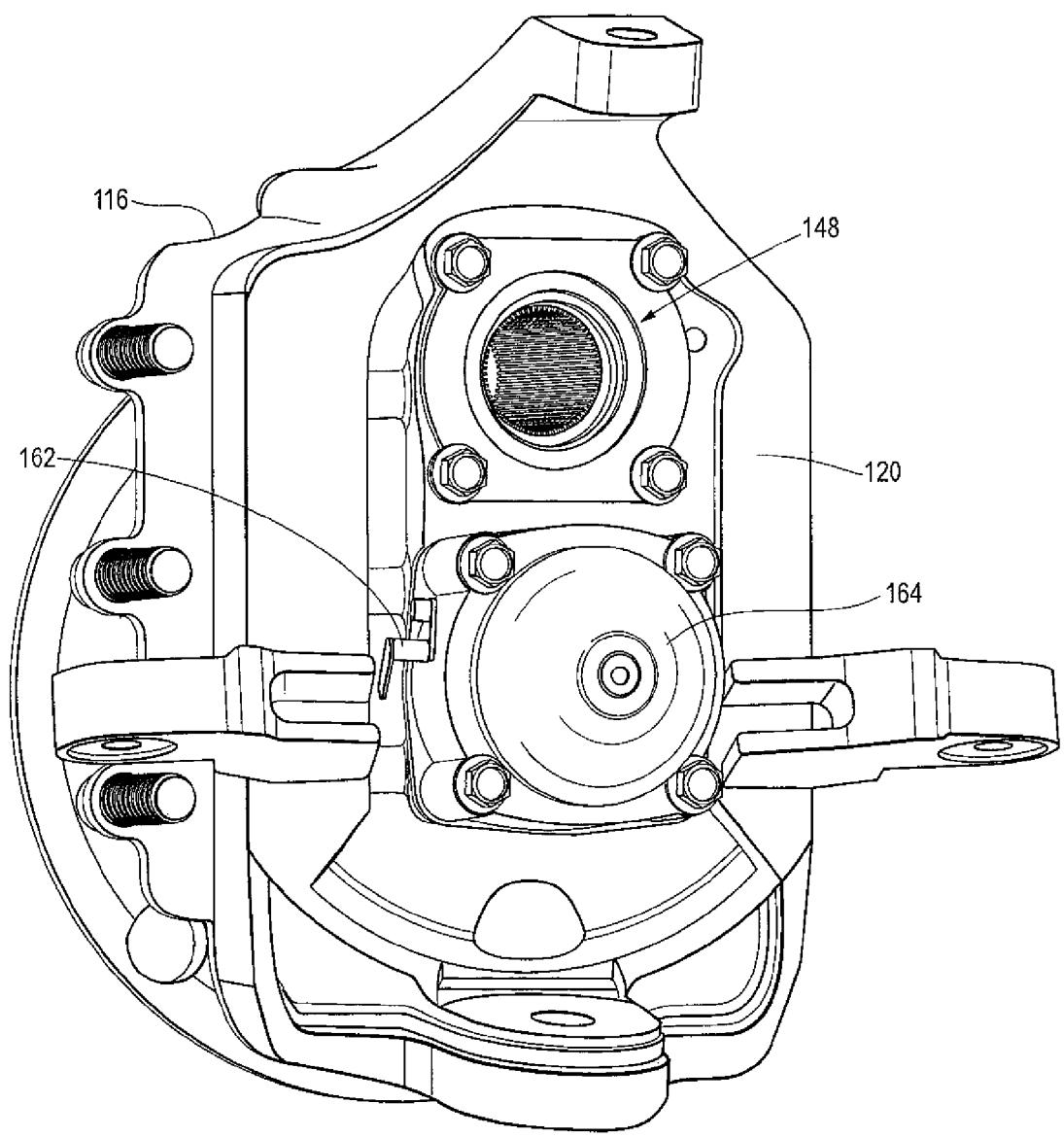
FIG. 4 is another perspective view of a two-piece geared hub assembly according to the present invention.
Figure 5:
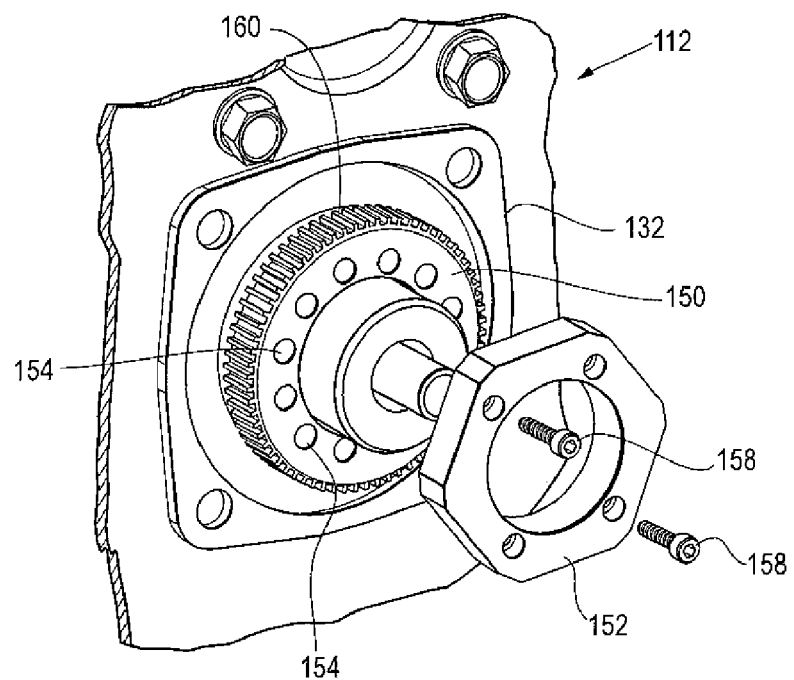
FIG. 5 is a perspective view of a portion of a two-piece geared hub assembly according to the present invention.
Figure 6:
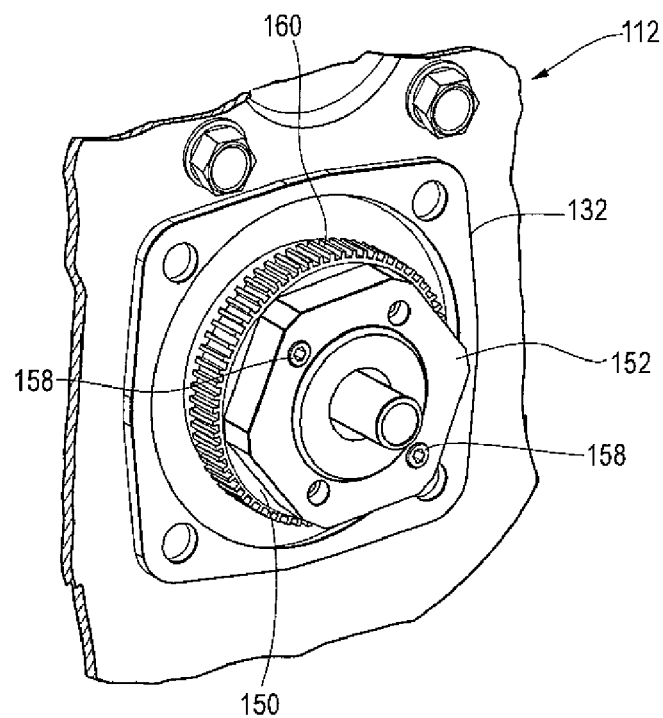
FIG. 6 is another perspective view of a portion of a two-piece geared hub assembly according to the present invention.

FIG. 1 illustrates a prior art geared hub assembly 10. Geared hub assembly 10 includes a housing 12 having bosses 14 to which a vehicle's suspension and steering linkage (not shown), for example, upper and lower control arms and a tie rod end, respectively, can be connected, as would be understood by one skilled in the art.

Housing 12 contains a number of internal components, for example, a gear set and bearings (not shown), which are accessible through one or more removable covers, for example, side cover 16. In the event an internal component fails, the foregoing access points allow the hub assembly to be repaired or rebuilt, as would be understood by one skilled in the art.

Repairing or rebuilding hub assembly 10 can be time consuming and is best accomplished in a controlled and clean environment. As such, should an internal component fail, the preferred repair procedure involves removing failed hub assembly 10 from the vehicle, replacing it with a new or previously repaired or rebuilt unit, repairing or rebuilding the failed unit in a shop, and making the repaired or rebuilt unit available as a replacement for another failed unit.

Removing hub assembly 10 from the vehicle requires disconnecting hub assembly 10 from the vehicle's suspension and steering linkage. This procedure typically requires special tools, for example, ball joint/tie rod separators, as would be recognized by one skilled in the art. Such tools might not be readily available when and where a hub assembly requires replacement, thereby precluding hub replacement and perhaps necessitating towing or abandonment of the vehicle. Even if such tools were available, some ball joint/tie rod separators, for example, pickle forks, have a tendency to damage the dust boots on the ball joints of the components they bear on during use. If a damaged dust boot is not repaired or replaced before the vehicle is returned to service, the corresponding ball joint is likely to become contaminated with dirt and water and, consequently, to fail prematurely.

Regardless of how hub assembly 10 is removed from the vehicle, the vehicle's wheel alignment typically would need adjustment following installation of a replacement part because even slight differences in geometry between the removed hub assembly 10 and the replacement hub assembly 10 could adversely affect the wheel alignment. Driving the vehicle with improper wheel alignment could be unpleasant or dangerous and could lead to premature wear or failure of the vehicle's tires, suspension components, and/or steering components.

FIGS. 2-7 illustrate a two-piece geared hub assembly 110 according to a preferred embodiment of the present invention. Hub assembly 110 includes hub cartridge 112 and cartridge carrier 114.

Cartridge carrier 114 preferably is configured as continuous peripheral wall 116 defining opening 118 therethrough. Flange 120 preferably extends toward the center of opening 118 from a portion of the interior of peripheral wall 116 at or near inboard end 122 thereof. Flange 120 thereby occludes a portion of opening 118 at or near inboard end 122 of peripheral wall 116. Flange 120 tends to stiffen peripheral wall 116, but could be omitted.

Suspension attachment bosses 124 preferably extend from upper and lower portions of peripheral wall 116 in a generally inboard direction, as would be understood by one skilled in the art. (The terms "inboard," "outboard," "front," and "rear" as used herein generally refer to orientation with respect to a vehicle in which hub assembly 10 might be installed, as would be understood by one skilled in the art.) Steering linkage attachment bosses 126 preferably extend from front and/or rear portions of peripheral wall 116 in generally inboard and front and rear directions, respectively, as would be understood by one skilled in the art. Attachment bosses 124, 126 preferably are configured to receive the attachment pins of ball joints (not shown) installed, respectively, in the control arms of the vehicle's suspension system and the tie rod ends of the vehicle's steering linkage, as would be understood by one skilled in the art.

Fastener bosses 128 configured to receive fasteners 130 preferably extend from the exterior of peripheral wall 116 proximate outboard end 170 thereof. Preferably, fasteners 130 are threaded fasteners, for example, hex-head or allenhead cap screws, and fastener bosses 128 are internally threaded so that threaded fasteners 130 can be secured thereto. In the illustrated embodiments, fastener bosses 128 define blind holes. In other embodiments, fastener bosses 128 could define unthreaded through-holes.

Cartridge carrier 114 can be made of any material suitable for the significant static and dynamic loads it can be anticipated to experience during use. Preferably, cartridge carrier 114 is made of heat-treated ductile iron or another suitable high strength material.

Hub cartridge 112 includes housing 132. Housing 112 preferably takes the general form of a hollow, oblong box having openings on the inboard and outboard surfaces thereof to accommodate an input shaft and a spindle, as will be discussed below. Housing 112 may also include an opening on a front, rear, inboard, or outboard surface thereof to facilitate maintenance of components contained within housing 132, and a cover, for example, rear cover 172, to close such opening. Housing 132 preferably includes mounting flange 134 extending peripherally from outboard end 172 of housing 132. Flange 134 defines a number of through-holes 136 corresponding to fastener bosses 128 extending from peripheral wall 116. In other embodiments, housing 132 could take any suitable form.

Figure 7:
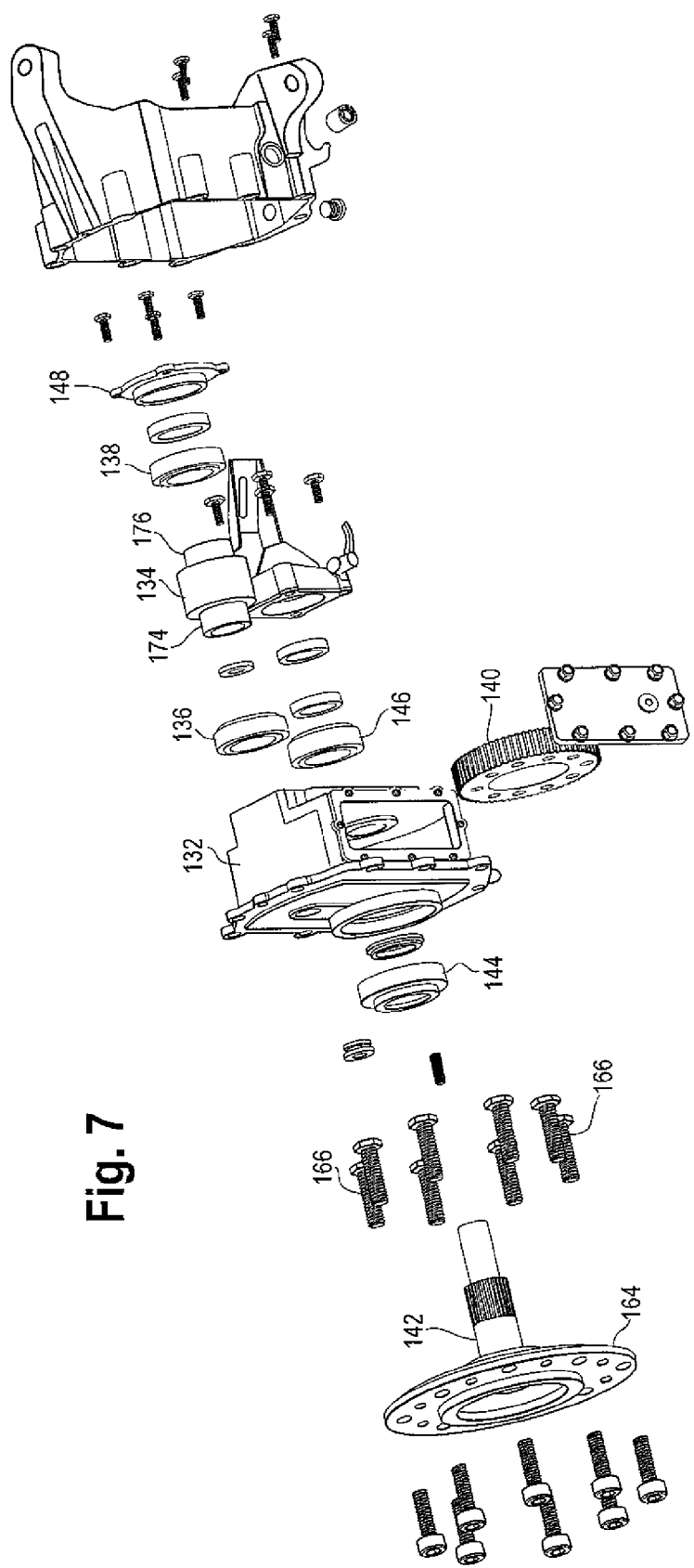
FIG. 7 is an exploded perspective view of a portion of a two-piece geared hub assembly according to the present invention.

Housing 132 preferably contains and carries a number of internal components similar to the components contained in and carried by one-piece geared hub assembly 10. More particularly, as illustrated in FIG. 7, housing 132 preferably contains input gear 134, outboard input gear bearing 136, inboard input gear bearing 138, output gear 140, spindle 142, outboard spindle bearing 144, and inboard spindle bearing 146, and may further contain related shims and seals, as would be recognized by one skilled in the art. Housing 132 can be made of any material suitable for the loads it can be anticipated to experience during use. Because housing 132 is not directly subjected to the substantial static and dynamic vehicle loads that cartridge carrier 114 is likely to experience, housing 132 can be, and preferably is, made of a lighter material than is cartridge carrier 114, thus reducing the overall weight of hub assembly 110. Preferably, housing 132 is made of a lightweight and easy to machine steel or other suitable material.

Outboard input gear bearing 136 includes an outer bearing race or cup preferably pressed into or otherwise supported by housing 132, a number of balls or rolling elements, and an inner bearing race or cup that receives shaft 174 extending from the outboard end of input gear 134. Inboard input gear bearing 138 similarly includes an outer bearing race or cup preferably pressed into or otherwise supported by housing 132 or an appurtenance thereto, a number of balls or rolling elements, and an inner bearing race or cup that receives shaft 176 extending from the inboard end of input gear 134. Input retainer 148, which preferably is made of steel (but could be made of other materials depending on the anticipated loads it would be subjected to) retains and preloads input gear 134 and input gear bearings 136, 138 in housing 132, as would be understood by one skilled in the art. Input gear 134 is thereby supported by input gear bearings 136, 138, which in turn are supported by housing 132.

Input gear 134 is configured to engage with an input shaft (not shown) so that each of these components can transfer torque to the other. Preferably, the input shaft is externally splined and input gear 134 is correspondingly internally splined, as would be understood by one skilled in the art.

Outboard spindle bearing 144 includes an outer bearing race or cup preferably pressed into or otherwise supported by housing 132, a number of balls or rolling elements, and an inner bearing race or cup that receives an outboard portion of spindle 142. Inboard spindle bearing 146 similarly includes an outer bearing race or cup preferably pressed into or otherwise supported by housing 132 or attachment thereto, a number of balls or rolling elements, and an inner race that receives an inboard portion of spindle 142. Tone ring 150 is engaged with and keyed to a keyway (not shown) formed into a portion of the inboard end of spindle 142 so that tone ring 150 is rotationally fixed with respect to spindle 142. Spindle nut 152 is threaded onto a corresponding threaded portion of the inboard end of spindle 142 so that spindle nut 152 bears against tone ring 150, which in turn bears against the outer bearing race or cup of inboard spindle bearing 146 or an appurtenant retainer therefor. Spindle 142 is thereby supported by spindle bearings 144, 146, which in turn are supported by housing 132.

Tone ring 150 preferably includes a number of threaded holes 154 arranged on a circle concentric with and between its inner circumference and outer circumference. Spindle nut 152 preferably includes a number of through-holes 156 arranged on a circle concentric with and outboard of its inner circumference. Preferably, spindle nut 152 can be positioned relative to tone ring 150 such that at least one of spindle nut through-holes 156 can be aligned with one of tone ring threaded holes 154. More preferably, spindle nut 152 can be positioned relative to tone ring 150 such that at least two of spindle nut through-holes 156 can be aligned with two tone ring threaded holes 154. Spindle nut 152 can be secured to spindle 142 by tightening spindle nut 152 to spindle 142 to a predetermined torque and then further rotating (or backing off) spindle nut 152 as necessary until one or more spindle nut through-holes 156 align with one or more tone ring threaded holes 154. Threaded fasteners 158 can then be inserted through spindle nut through-holes 156, threaded into tone ring threaded holes 154, and torqued as desired.

Tone ring 150 preferably is embodied as a toothed wheel. Teeth 160 interact with a corresponding Hall effect sensor 162 to generate pulses indicative of wheel speed for use by a detection circuit (not shown), as would be recognized by one skilled in the art. The wheel speed information can be used by a traction control and/or ABS system to control the drive and/or brake torque at each wheel. Tone ring 150 preferably is covered by cover 164, which protects tone ring 150 from contamination and damage.

Output gear 140 is engaged with spindle 142 so that each can transfer torque to the other. Preferably spindle 142 is externally splined and output gear 140 is correspondingly internally splined, as would be understood by one skilled in the art. Input gear 134 is in mesh with output gear 140 so that each can transfer torque to the other.

Wheel flange 164 is attached to the outboard end of spindle 142. Wheel flange 164 can include wheel studs 166 that can be received by corresponding holes on a wheel (not shown) attached to wheel flange 164. Alternatively, wheel flange 164 can include threaded holes for receiving wheel bolts (not shown) used to attach a wheel to wheel flange 164.

Housing 132 is configured to nest within opening 118 of cartridge carrier 114. When hub cartridge 112 is installed into cartridge carrier 114, the inboard surface of housing 132 can, but need not, abut carrier flange 122, and housing flange 134 abuts fastener bosses 128 and outboard end surface 174 of peripheral wall 116. Housing 132 and cartridge carrier 114 preferably are configured such that hub cartridge 112, once nested within cartridge carrier 114, cannot freely rotate within cartridge carrier 114. With housing 132 nested within cartridge carrier 114, fasteners 130 can be inserted through holes 136 in mounting flange 134 and into fastener bosses 128. In embodiments where fastener bosses 128 are threaded, fasteners 130 can be torqued into fastener bosses 128. In embodiments where fastener bosses 128 are through-holes, fasteners 130 could be inserted through fastener bosses 128 and secured with threaded nuts (not shown), as would be understood by one skilled in the art.

The foregoing description and drawing figures disclose certain embodiments of the present invention, but do not limit its scope, which is defined solely by the appended claims. One skilled in the art would recognize that the embodiments disclosed herein could be modified without departing from the scope of the invention as claimed below.

The invention claimed is:

1. A hub assembly for a vehicle, said hub assembly comprising:
   a hub cartridge comprising:
      a housing;
      a spindle bearing supported by said housing; and
      a spindle supported by said spindle bearing; and
   a cartridge carrier comprising a continuous peripheral wall configured to slidingly receive and substantially surround an outer portion of said hub cartridge housing;
   said hub cartridge connectable to and separable from said cartridge carrier; and
   said cartridge carrier configured for attachment to a suspension component of said vehicle.

2. The hub assembly of claim 1 wherein said cartridge carrier further is configured for attachment to a steering component of said vehicle.

3. The hub assembly of claim 1 wherein said hub cartridge and said cartridge carrier are configured to preclude substantial rotation of said hub cartridge with respect to said cartridge carrier when said hub cartridge is connected to said cartridge carrier.

4. The hub assembly of claim 1 wherein said hub cartridge further comprises at least one removable access panel providing access to internal components of said hub cartridge.

5. The hub assembly of claim 1 wherein said cartridge carrier further comprises a flange extending from said continuous peripheral wall.

6. The hub assembly of claim 5 wherein said flange extends inwardly from said continuous peripheral wall.

7. The hub assembly of claim 1 wherein said hub cartridge is user-serviceable.

8. A geared hub assembly for a vehicle, said geared hub assembly comprising:
   a hub cartridge, said hub cartridge comprising:
      a housing;
      an input gear bearing supported by said housing;
      an input gear supported by said input gear bearing, said input gear configured to receive an input shaft in splined engagement therewith;
      a spindle bearing supported by said housing;
      a spindle supported by said spindle bearing, said spindle connected to a wheel hub; and
      an output gear in splined engagement with said spindle, said input gear in geared engagement with said output gear; and
   a cartridge carrier comprising a continuous peripheral wall configured to slidingly receive and substantially surround an outer portion of said hub cartridge housing;
   said hub cartridge connectable to and separable from said cartridge carrier; and
   said cartridge carrier configured for attachment to a suspension component of said vehicle.

9. The geared hub assembly of claim 8 wherein said cartridge carrier further is configured for attachment to a steering component of said vehicle.

10. The geared hub assembly of claim 8 wherein said hub cartridge further comprises an integral wheel speed sensor in operable engagement with said spindle.

11. The geared hub assembly of claim 8 wherein said hub cartridge further comprises a wheel speed sensor, a spindle nut, and means for securing said spindle nut to said spindle.

12. The geared hub assembly of claim 11 wherein said means for securing said spindle nut to said spindle comprises at least one threaded hole in said wheel speed sensor, at least one through hole in said spindle nut, and a threaded fastener engagable through said through hole in said spindle nut and into said threaded hole in said wheel speed sensor.

13. The hub assembly of claim 8 wherein said hub cartridge and said cartridge carrier are configured to preclude substantial rotation of said hub cartridge with respect to said cartridge carrier when said hub cartridge is connected to said cartridge carrier.

14. The hub assembly of claim 8 wherein said hub cartridge further comprises at least one removable access panel providing access to internal components of said hub cartridge.

15. The hub assembly of claim 8 wherein said cartridge carrier further comprises a flange extending from said continuous peripheral wall.

16. The hub assembly of claim 15 wherein said flange extends inwardly from said continuous peripheral wall.

17. The hub assembly of claim 8 wherein said hub cartridge is user-serviceable.

* * * * *